(12) United States Patent
Swanson et al.

(10) Patent No.: US 7,946,432 B1
(45) Date of Patent: May 24, 2011

(54) DUAL LEVEL BICYCLE PARKING SYSTEM

(75) Inventors: Neil Swanson, Janesville, WI (US);
Heath A. Fossen, Madison, WI (US);
William B. Stephens, Boulder, CO (US)

(73) Assignee: Saris Cycling Group, Inc., Madison, WI (US)

(*) Notice: Subject to any disclaimer, the term of this patent is extended or adjusted under 35 U.S.C. 154(b) by 835 days.

(21) Appl. No.: 11/619,940

(22) Filed: Jan. 4, 2007

(51) Int. Cl.
*A47F 7/00* (2006.01)
(52) U.S. Cl. .......................................... 211/20; 211/22
(58) Field of Classification Search ................ 211/5, 17, 211/20, 24, 85.7, 19, 22, 85.3; 414/462; 224/310, 509, 924
See application file for complete search history.

(56) References Cited

U.S. PATENT DOCUMENTS

| | | | | |
|---|---|---|---|---|
| 557,900 | A * | 4/1896 | Shannon | 70/234 |
| 565,057 | A * | 8/1896 | Wetsphal | 211/5 |
| 636,324 | A | 11/1899 | Ehrenberg | |
| 639,517 | A * | 12/1899 | Butcher | 211/5 |
| 639,991 | A | 12/1899 | Jewell | |
| 650,663 | A | 5/1900 | Whitcher | |
| 2,460,945 | A * | 2/1949 | Nighthart | 211/22 |
| 3,603,459 | A * | 9/1971 | Erb | 211/20 |
| 3,655,082 | A * | 4/1972 | Garrett | 414/462 |
| 3,682,523 | A * | 8/1972 | Esposito | 312/198 |
| 3,770,133 | A * | 11/1973 | Kolker | 211/19 |
| 3,843,001 | A * | 10/1974 | Willis | 414/462 |
| 3,861,533 | A * | 1/1975 | Radek | 211/20 |
| 3,872,972 | A | 3/1975 | Cummins et al. | |
| 3,883,002 | A * | 5/1975 | Moore | 211/18 |
| 3,912,139 | A * | 10/1975 | Bowman | 410/3 |
| 3,924,751 | A | 12/1975 | Ballenger | |
| 3,973,812 | A | 8/1976 | Poltorak | |
| 3,994,425 | A * | 11/1976 | Graber | 224/324 |
| 4,015,718 | A * | 4/1977 | Bernard | 211/5 |
| 4,016,686 | A | 4/1977 | Hartger et al. | |
| 4,171,077 | A * | 10/1979 | Richard, Jr. | 224/500 |
| 4,213,729 | A * | 7/1980 | Cowles et al. | 414/462 |
| 4,306,660 | A | 12/1981 | Livingston | |
| 4,318,501 | A * | 3/1982 | Graber | 224/515 |
| 4,392,572 | A | 7/1983 | Bernard | |
| 4,416,379 | A * | 11/1983 | Graber | 211/19 |

(Continued)

FOREIGN PATENT DOCUMENTS

CN 2223934 Y 4/1996

(Continued)

OTHER PUBLICATIONS

"Two-tier parking DoubleDeck Rack", www.bikeparking.comldoubledeckerrack/index.html, printed from internet May 9, 2005.

(Continued)

*Primary Examiner* — Darnell M Jayne
*Assistant Examiner* — Joshua Rodden
(74) *Attorney, Agent, or Firm* — Boyle Fredrickson, s.c.

(57) ABSTRACT

A bicycle parking system includes a frame having a number of lower supports and a number of upper supports, each support being constructed to receive a bicycle. The frame includes a slide bar operatively engaged with each of the upper supports. Each slide bar includes a curved end to allow the attached upper support to rotate relative to the slide bar for loading and unloading of the upper support. A spring assembly biases each upper support toward a stored position.

14 Claims, 8 Drawing Sheets

U.S. PATENT DOCUMENTS

| | | | |
|---|---|---|---|
| 4,555,029 A | 11/1985 | Fiol | |
| 4,630,990 A * | 12/1986 | Whiting | 414/462 |
| 4,815,638 A * | 3/1989 | Hutyra | 224/525 |
| 5,052,605 A * | 10/1991 | Johansson | 224/324 |
| 5,238,125 A | 8/1993 | Smith | |
| 5,377,886 A * | 1/1995 | Sickler | 224/521 |
| 5,435,475 A * | 7/1995 | Hudson et al. | 224/324 |
| D361,539 S | 8/1995 | Matlaga | |
| D361,742 S | 8/1995 | Matlaga | |
| 5,449,074 A | 9/1995 | Paulson et al. | |
| 5,492,228 A * | 2/1996 | Botkin | 211/85.7 |
| 5,505,579 A * | 4/1996 | Ray et al. | 414/462 |
| 5,549,231 A * | 8/1996 | Fletcher et al. | 224/536 |
| 5,632,591 A * | 5/1997 | Henriquez | 414/462 |
| 5,642,820 A | 7/1997 | Angeles | |
| 5,690,259 A * | 11/1997 | Montani | 224/310 |
| 5,692,659 A * | 12/1997 | Reeves | 224/536 |
| 5,730,577 A * | 3/1998 | Jones | 414/462 |
| 5,749,474 A | 5/1998 | Woodcock | |
| 5,772,048 A | 6/1998 | Sopcisak | |
| 5,820,002 A * | 10/1998 | Allen | 224/324 |
| 5,845,788 A | 12/1998 | Robolin | |
| 5,917,407 A * | 6/1999 | Squire et al. | 340/432 |
| 5,941,397 A * | 8/1999 | Buchanan et al. | 211/19 |
| 5,984,111 A * | 11/1999 | Pennella | 211/5 |
| 5,988,403 A * | 11/1999 | Robideau | 211/20 |
| 5,996,870 A * | 12/1999 | Shaver | 224/532 |
| 6,082,552 A | 7/2000 | Pollock et al. | |
| 6,095,344 A | 8/2000 | White | |
| 6,149,039 A * | 11/2000 | Englander | 224/310 |
| 6,161,702 A | 12/2000 | Campbell | |
| 6,164,459 A | 12/2000 | Liem | |
| 6,237,781 B1 | 5/2001 | Dahl | |
| 6,336,562 B1 * | 1/2002 | Mori | 211/20 |
| 6,419,096 B1 | 7/2002 | Shepherd | |
| 6,427,888 B1 * | 8/2002 | Condon et al. | 224/310 |
| 6,460,743 B2 * | 10/2002 | Edgerly et al. | 224/324 |
| 6,561,398 B1 * | 5/2003 | Cole et al. | 224/324 |
| 6,637,602 B2 | 10/2003 | Dueck | |
| 6,691,878 B1 | 2/2004 | Ouitz | |
| 6,698,994 B2 * | 3/2004 | Barrett | 414/462 |
| 6,843,380 B1 | 1/2005 | Fickett | |
| 6,866,175 B2 * | 3/2005 | Munoz et al. | 224/324 |
| 6,868,998 B2 * | 3/2005 | Dean | 224/324 |
| 6,968,986 B1 * | 11/2005 | Lloyd et al. | 224/507 |
| 7,472,517 B2 * | 1/2009 | Blume | 52/79.1 |
| 7,481,027 B2 * | 1/2009 | Blume | 52/79.1 |
| 2002/0175196 A1 | 11/2002 | Johnson | 224/514 |
| 2003/0141263 A1 * | 7/2003 | Dueck | 211/17 |
| 2004/0050807 A1 | 3/2004 | Cheng | |
| 2004/0060878 A1 * | 4/2004 | Ho | 211/17 |
| 2004/0222172 A1 | 11/2004 | Bleazard | |
| 2004/0226899 A1 | 11/2004 | Ferron | |
| 2007/0221589 A1 * | 9/2007 | Bernard | 211/17 |

FOREIGN PATENT DOCUMENTS

| | | | |
|---|---|---|---|
| CN | 2329578 Y | | 7/1999 |
| CN | 2408009 Y | | 11/2000 |
| DE | 3238404 A1 | * | 4/1984 |
| DE | 3520765 A1 | * | 12/1986 |
| DE | 4126797 | | 3/1992 |
| DE | 4210902 | | 10/1993 |
| DE | 29605930 U | | 7/1996 |
| DE | 19547369 | | 6/1997 |
| DE | 19629016 | | 1/1998 |
| DE | 19831886 | | 1/2000 |
| DE | 2005133 U | | 6/2000 |
| DE | 10013787 | | 10/2001 |
| DE | 20209936 U | | 10/2002 |
| DE | 20211721 U | | 2/2003 |
| DE | 20308087 U | | 8/2003 |
| DE | 202004009779 U | | 2/2005 |
| EP | 939025 A1 | * | 9/1999 |
| EP | 1479598 | | 11/2004 |
| ES | 2020115 | | 7/1991 |
| FR | 2587691 A2 | * | 3/1987 |
| FR | 2606344 A1 | * | 5/1988 |
| JP | 57058772 | | 4/1982 |
| JP | 03273981 A | * | 12/1991 |
| JP | 05213248 A | * | 8/1993 |
| JP | 05221355 A | * | 8/1993 |
| JP | 06107081 A | * | 4/1994 |
| JP | 6199256 | | 7/1994 |
| JP | 06199256 A | * | 7/1994 |
| JP | 8277647 | | 10/1996 |
| JP | 9112059 | | 4/1997 |
| JP | 93110526 | | 12/1997 |
| JP | 10250652 | | 9/1998 |
| JP | 11180358 | | 7/1999 |
| JP | 11247478 | | 9/1999 |
| JP | 11301541 | | 11/1999 |
| JP | 2000168649 | | 6/2000 |
| JP | 2001010565 | | 1/2001 |
| JP | 2001317226 | | 11/2001 |
| JP | 2002112866 | | 4/2002 |
| JP | 2002154466 | | 5/2002 |
| JP | 2003341569 | | 12/2003 |
| NL | 1011042 C | | 8/1999 |
| WO | WO 9222718 A1 | * | 12/1992 |

OTHER PUBLICATIONS

"Cycle-Safe® Introduces First Fiberglass Two-Tiered Bike Storage", Cycle-Safe, Inc., 478 Arrowhead SE, Grand Rapids, MI 49546, undated.

* cited by examiner

DUAL LEVEL BICYCLE PARKING SYSTEM

BACKGROUND OF THE INVENTION

This invention relates to a parking system for use with bicycles or the like, and more particularly to a bicycle parking system for parking a number of bicycles in a compact and stacked orientation.

A typical stationary support for a wheeled device, such as a bicycle, involves a frame that includes a number of open spaces, each of which is configured to receive a bicycle wheel. The frame generally includes a pair of cross-members that prevent the wheel from rolling when the wheel is received within one of the spaces, and a number of pairs of vertical members that maintain each respective bicycle in an upright orientation. Generally, such bicycle parking systems form one row of compactly organized bicycles. In environments in which bicycle usage is extensive, such as educational campuses, densely populated areas, or the like, bicycle parking systems quickly fill with bicycles which requires additional bicycle users to secure bicycles to other fixed objects, such as light posts, parking meters, etc. Although such activity secures the bicycles against theft, it is unsightly and can impede pedestrian and vehicle traffic in the surrounding area.

Stacked or multi-level bicycle parking systems have been developed in order to accommodate a greater number of bicycles in a given area. One such system includes a lower row of bicycle parking positions and an upper row of bicycle parking positions. The upper row includes an extendible ramp or support that is constructed to be extended out beyond the lower row of supports and to pivot toward the user. The user then positions a bicycle upon the pivoted ramp. A pair of fingers engage the wheel of the bicycle to maintain its position upon the ramp, and the user must then lift and return the ramp to the stored position generally above the lower row.

Although bicycle parking systems as described above provide compact, high density bicycle storage, there are certain drawbacks associated with the construction and operation of such systems. For example, the connection of the ramp of the upper row of bicycle parking spaces to the supporting framework, as well as the construction of the ramp, may prevent some users from utilizing the bicycle parking system in that the height, operation, and weight of the ramp makes it difficult for less physically capable users to position and store a bicycle in the spaces associated with the upper parking locations. It can be a difficult task for some users to lift both the ramp and the bicycle and translate the loaded ramp relative to the frame. Accordingly, there is a need for a multi-level bicycle parking system that is simple to operate and that can be operated by a wide range of persons having different physical capabilities.

SUMMARY OF THE INVENTION

The present invention provides a bicycle parking system that overcomes the aforementioned drawbacks. A bicycle parking system according to the present invention includes a frame having a number of lower supports and a number of upper supports, each of which is constructed to receive and support a bicycle. Each upper support is movably engaged with a slide bar associated with the frame, and is movable between a retracted position for storage and an extended position for loading or unloading. Each slide bar includes a curved end that allows the upper support that is engaged with the slide bar to pivot or rotate relative to the slide bar when in the extended position, to facilitate loading and unloading of the bicycle. Preferably, the bicycle parking system includes a user aid, such as a spring or other like device, constructed to bias each upper support toward the retracted position thereby reducing the load that must be applied to move the loaded support from the extended position to the retracted position.

One aspect of the invention contemplates a bicycle parking system having a frame, a first support, a slide bar and a second support. The first support is stationarily secured to the frame and is constructed for engaging and supporting a bicycle at a lower region of the frame. The slide bar has a curved outer end, and is attached to the frame generally above the first support. The second support is movably mounted to the slide bar, and is constructed for engaging and supporting another bicycle above the first support at an upper region of the frame. The second support is moveable along the slide bar between a first, retracted position and a second, extended position in which the second support pivots or rotates about the curved outer end of the slide bar for loading and unloading of the second support.

In accordance with another aspect of the present invention, a bicycle rack includes a frame having a pair of end posts, and lower and upper rails extending between the pair of end posts. At least one lower guide is connected to the lower rail and is constructed to engage a bicycle. At least one upper guide is moveably connected to the upper rail and constructed to extend from the frame beyond the lower guide and to rotate relative to the frame, such that an outer end of the upper guide is positioned downwardly toward a ground surface relative to an inner end of the upper guide. The upper guide includes a wheel stop that is constructed to engage a wheel of a bicycle to fix a position of the bicycle relative to the upper guide.

A further aspect of the invention contemplates a method of forming a bicycle parking system that includes forming a number of upper and lower bicycle parking assemblies. The method includes forming a frame for engaging each of the upper and lower bicycle parking assemblies, and engaging the upper bicycle parking assemblies with the frame such that each upper bicycle parking assembly extends and rotates relative to a respective lower bicycle parking assembly. The method further contemplates biasing each upper bicycle parking assembly relative to the frame toward a retracted or stored position.

Various other features, aspects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings.

DETAILED DESCRIPTION

Figure 1:
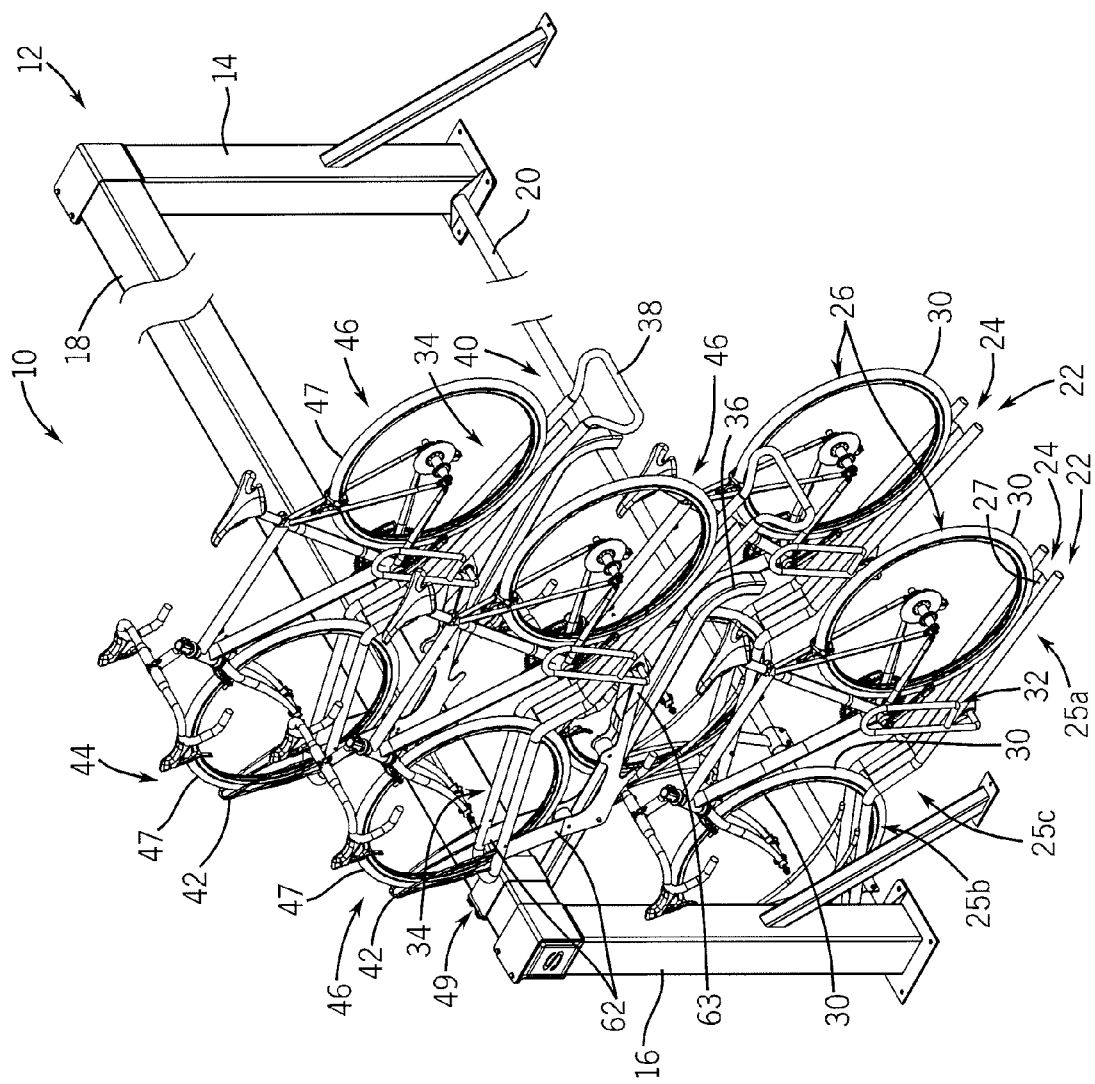
FIG. 1 is a perspective view of a bicycle parking system according to the present invention, showing a number of bicycles parked on upper and lower levels of the parking system.
Figure 2:
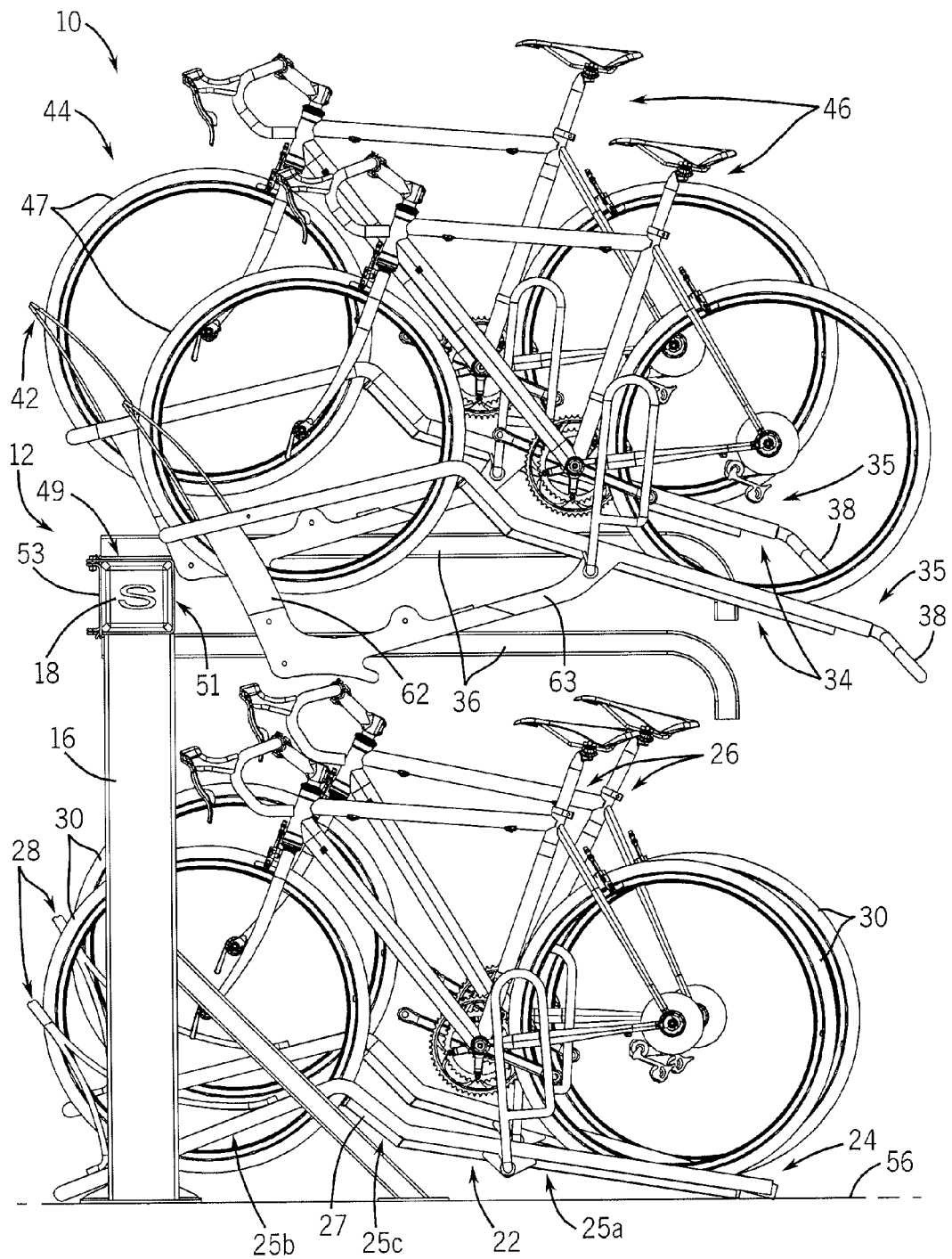
FIG. 2 is an end elevational view of the bicycle parking system of FIG. 1.

Referring to FIGS. 1 and 2, a bicycle parking system 10 according to the present invention includes a frame assembly 12 having a pair of end posts 14, 16, and an upper frame member or rail 18 and a lower frame member or rail 20 extending between the end posts 14, 16. A number of lower supports 22 are connected to lower rail 20 of frame assembly 12, and a number of upper supports 34 are connected to upper rail 18. While the drawings illustrate two lower supports 22 and two upper supports 34, it is understood that any desired number of lower supports 22 and upper supports 34 may be located between end posts 14, 16.

Each lower support 22 forms a trough-shaped guide 24 constructed to receive a pair of wheels 30 associated with a vehicle, such as a bicycle 26, in the trough of the guide 24. Each trough-shaped guide 24 may be formed of a pair of bent, spaced apart tubular members, and defines a rear support area 25a, a front support area 25b, and an angled intermediate area 25c located therebetween. Each guide 24 includes a support wall 27 that extends between the bent tubular members at rear support area 25a and angled intermediate area 25c. The front edge of support wall 27 is located adjacent the intersection between front support area 25b and intermediate area 25c, and the space between the tubular members of guide 24 at front support area 25b is void. In this manner, as the bicycle 26 is advanced on guide 24, the front wheel 30 of a bicycle 26 is supported on rear support area 25a and intermediate area 25c by support wall 27. When the front bicycle wheel 30 reaches front support area 25b, the front bicycle wheel 30 drops into the space between the tubular members of guide 24 such that the tubular members are located one on either side of the front bicycle wheel 30 and the rear of the front bicycle wheel 30 contacts the forwardly facing edge of support wall 27.

Figure 3:
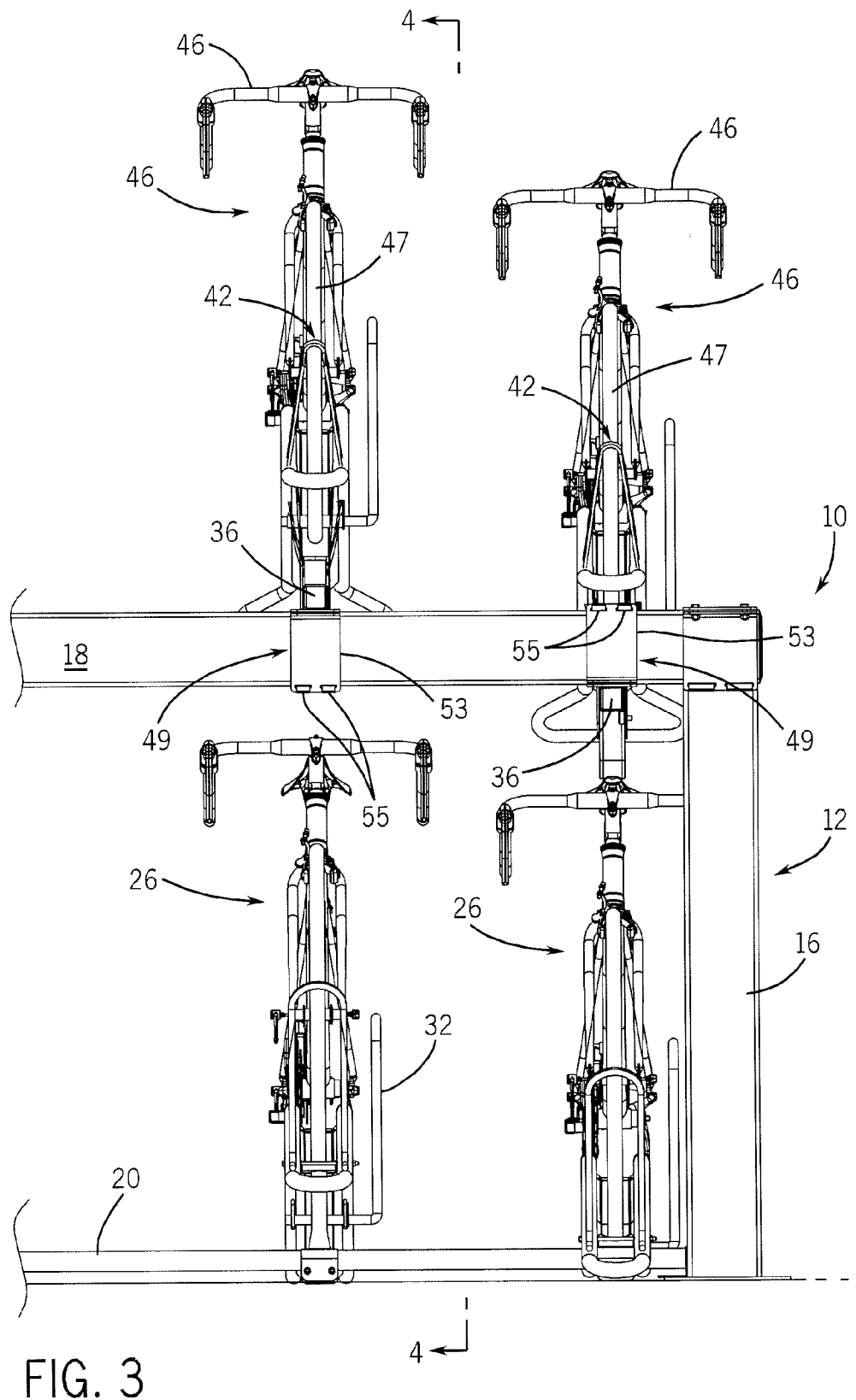
FIG. 3 is a partial side elevational view of the bicycle parking system of FIG. 1.

Each guide 24 includes a wheel stop 28 at its forward end, which is constructed to generally flank the front wheel 30 of bicycle 26 when the bicycle 26 is advanced onto the guide 24. The wheel stop 28 is closed at its forward end (as shown in FIG. 3), so as to engage the front of the front bicycle wheel 30 when the front bicycle wheel 30 is advanced so as to drop into the space between the tubular members of guide 24 at front support area 25b. In this manner, the engagement of the front bicycle wheel 30 with wheel stop 28 and the front edge of support wall 27, in combination with the side areas of wheel stop 28 and the tubular members of front support area 25b, functions to maintain the bicycle 26 in an upright orientation when the bicycle 26 is engaged with the support 22. A lock loop 32 is pivotably mounted to guide 24 and is constructed to allow a user to lock or otherwise secure bicycle 26 to bicycle parking system 10 through the use of a chain, a U-lock or other securing means.

Each upper support 34 is moveably connected to an upper guide member or slide bar 36 that is attached to upper rail 18 of frame assembly 12. A grab handle 38 is formed at a rear end 40 of each upper support 34, and a wheel stop 42 is located at a forward end 44 of each upper support 34. Each upper support 34 includes a trough-shaped guide 35 that is formed similarly to the guide 24 of each lower support 22, and which functions similarly to the lower support guide 24 to guide an upper bicycle 46 onto the upper support 34 and to maintain the upper bicycle 46 in an upright position. Wheel stop 42 is constructed similarly to wheel stop 28, and engages a front one of a pair of upper bicycle wheels 47 to maintain an upright orientation of the upper bicycle 46 engaged with the upper support 34. Wheel stop 42 also maintains engagement of the upper bicycle 46 with the upper support 34 during movement of the upper support 34 relative to frame assembly 12, as will be explained. Such a construction allows two-handed operator manipulation of grab handle 38 when moving the upper support 34 on slide bar 36.

As shown in FIG. 2, lower supports 22 and upper supports 34 are vertically offset from one another to provide two tiered storage of bicycles engaged with bicycle parking system 10. In addition, adjacent lower supports 22 are vertically offset from one another to allow each bicycle 26 to be engaged with and removed from bicycle parking system 10 without interfering with adjacent bicycles 26. The vertical offset allows relatively compact spacing of the bicycles such that the handlebars, or like protruding structures, of each bicycle 26 do not interfere with the adjacent bicycles 26. Adjacent upper supports 34 are also vertically offset from one another to allow each upper bicycle 46 to be engaged with and removed from bicycle parking system 10 without interfering with the adjacent upper bicycles 46.

Figure 4:
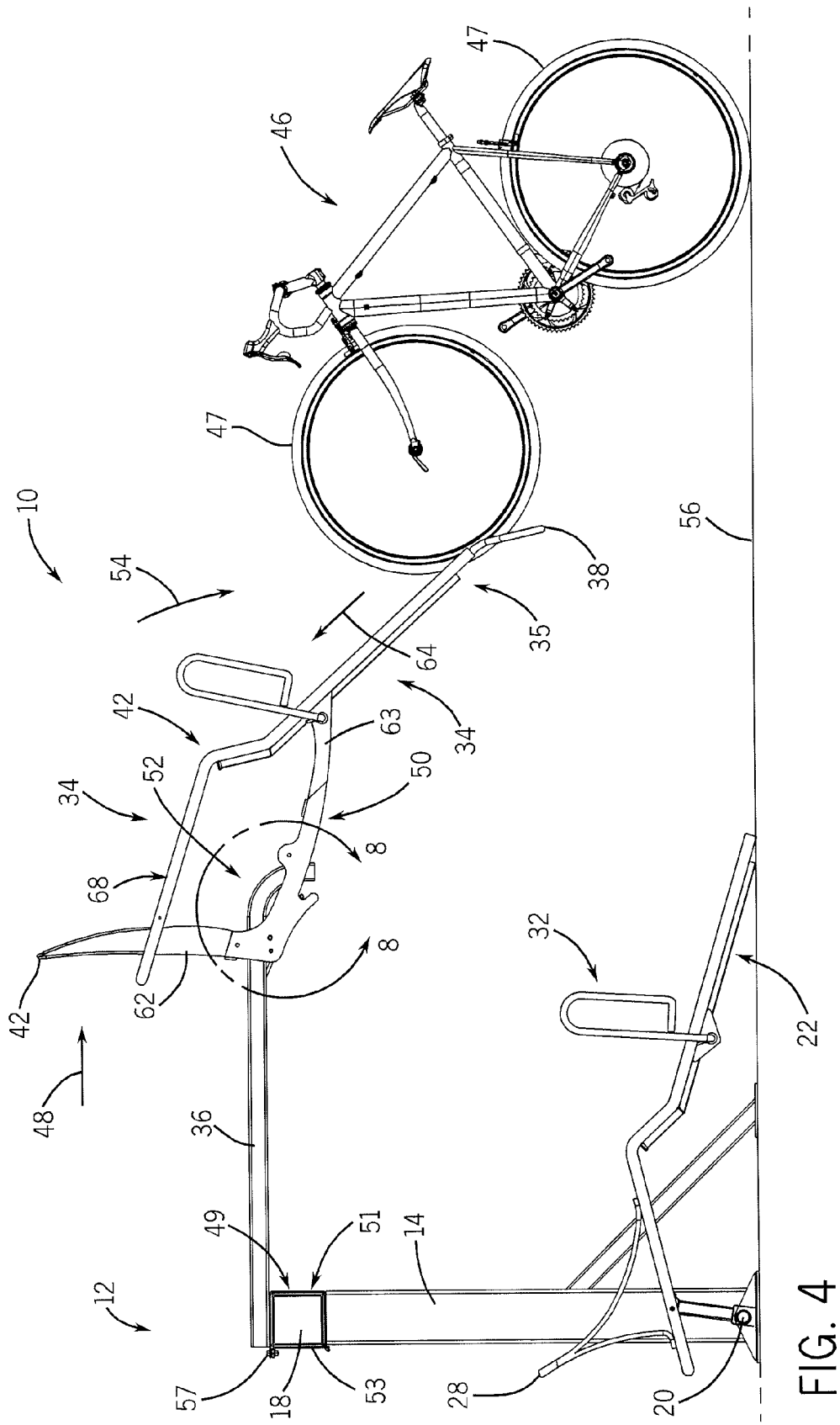
FIG. 4 is an end elevational view similar to FIG. 2 with reference to line 4-4 of FIG. 3, showing one of the upper bicycle supports in an extended position for loading or unloading a bicycle, and a bicycle engaged with the extended upper support.

In the illustrated embodiment, each slide bar 36 is secured to the upper rail 18 by means of a collar 49. Each collar 49 defines a cross section that matches that of upper rail 18, and is configured for engagement with upper rail 18 to secure its associated slide bar 36 in position at a selected location along the length of upper rail 18. Referring to FIGS. 3 and 4, each collar 49 may representatively include a C-shaped member 51 configured to slide transversely onto upper rail 18. The forward end of slide bar 36 is mounted to one of the parallel legs of each C-shaped member 51. A closure plate 53 includes a pair of slots at one end that are configured to receive a pair of tabs 55 that extend from the end of one of the parallel legs of C-shaped member 51. At the opposite end, closure plate 53 defines a lip that includes openings that are aligned with openings formed in an extended end area of the opposite leg of C-shaped member 51. Threaded fasteners or the like, shown at 57 (FIG. 4), extend through the aligned openings in the closure plate lip and the extended end area of the leg of C-shaped member 51, and are operable when tightened together to clamp C-shaped member 51 onto upper rail 18. In this manner, each collar 49 functions to fix its associated slide bar 36 in a desired position on upper rail 18. This construction enables a user to adjust the positions of slide bars 36, at any horizontal position with infinite adjustability, and also allows each upper support 34 to be removed for repair or replacement, without the need to disassemble the entire parking system 10. It is understood that, while this type of slide bar mounting arrangement functions satisfactorily and provides numerous assembly and operational advantages, any other satisfactory type of slide bar mounting arrangement may be employed.

In the illustrated embodiment, the vertical offset of adjacent upper supports 34 is accomplished by alternately positioning slide bars 36 above and below upper rail 18. That is, each slide bar 36 is engaged with its associated collar 49 so as to be located either above or below upper rail 18. The inner end of the slide bar 36 is secured, such as by welding, to the leg of the C-shaped member 51, which is then engaged with the upper rail 18 so as to position the slide bar 36 in the desired orientation. In this manner, the adjacent slide bars 36, and thereby the adjacent upper supports 34, are separated vertically by a distance corresponding to the height of the upper rail 18. This provides a convenient and economical means by which a vertical offset between adjacent upper supports 34 can be accomplished.

Referring to FIG. 3, bicycles 26 engaged with lower supports 22 and bicycles 46 engaged with upper supports 34 are generally aligned along a longitudinal axis of bicycle parking system 10. Such a configuration provides convenient user interaction with the bicycle parking system 10 by allowing user access between adjacent bicycles regardless of whether a particular user's bicycle is positioned in an upper or lower parking row. That is, the vertically aligned sets of upper supports 34 and lower supports 22 enable a user to easily move between the parked bicycles in order to access a lock or other securing means utilized to lock his or her bicycle to the parking system 10. A user can then easily insert or extract a bicycle by standing at a location near the rear of the parking system 10 without having to move between adjacent bicycles.

Figure 5:
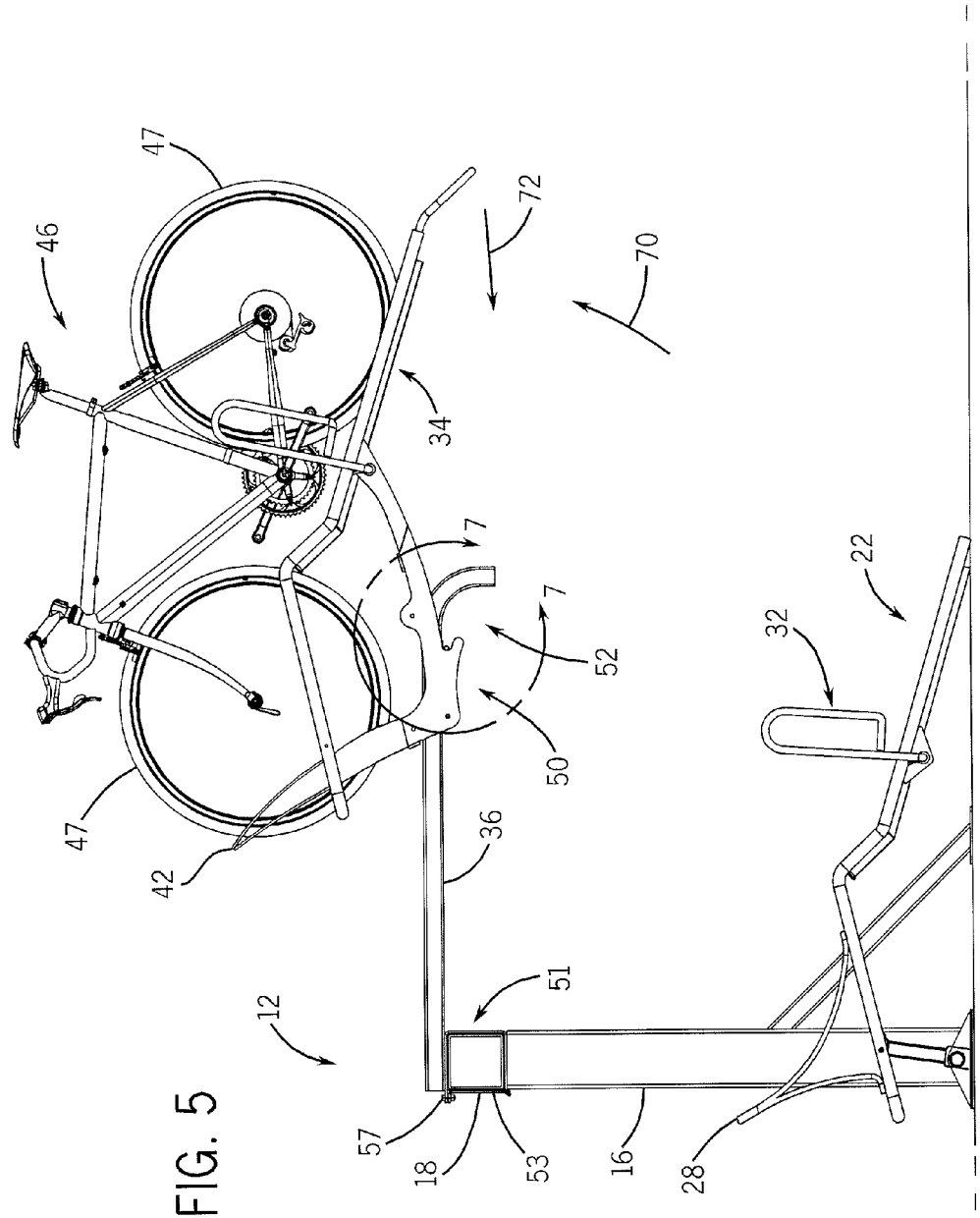
FIG. 5 is an end elevational view of the bicycle parking system as in FIG. 4, showing the bicycle positioned on the upper support and the upper support moved partially to a retracted, stored position.
Figure 6:
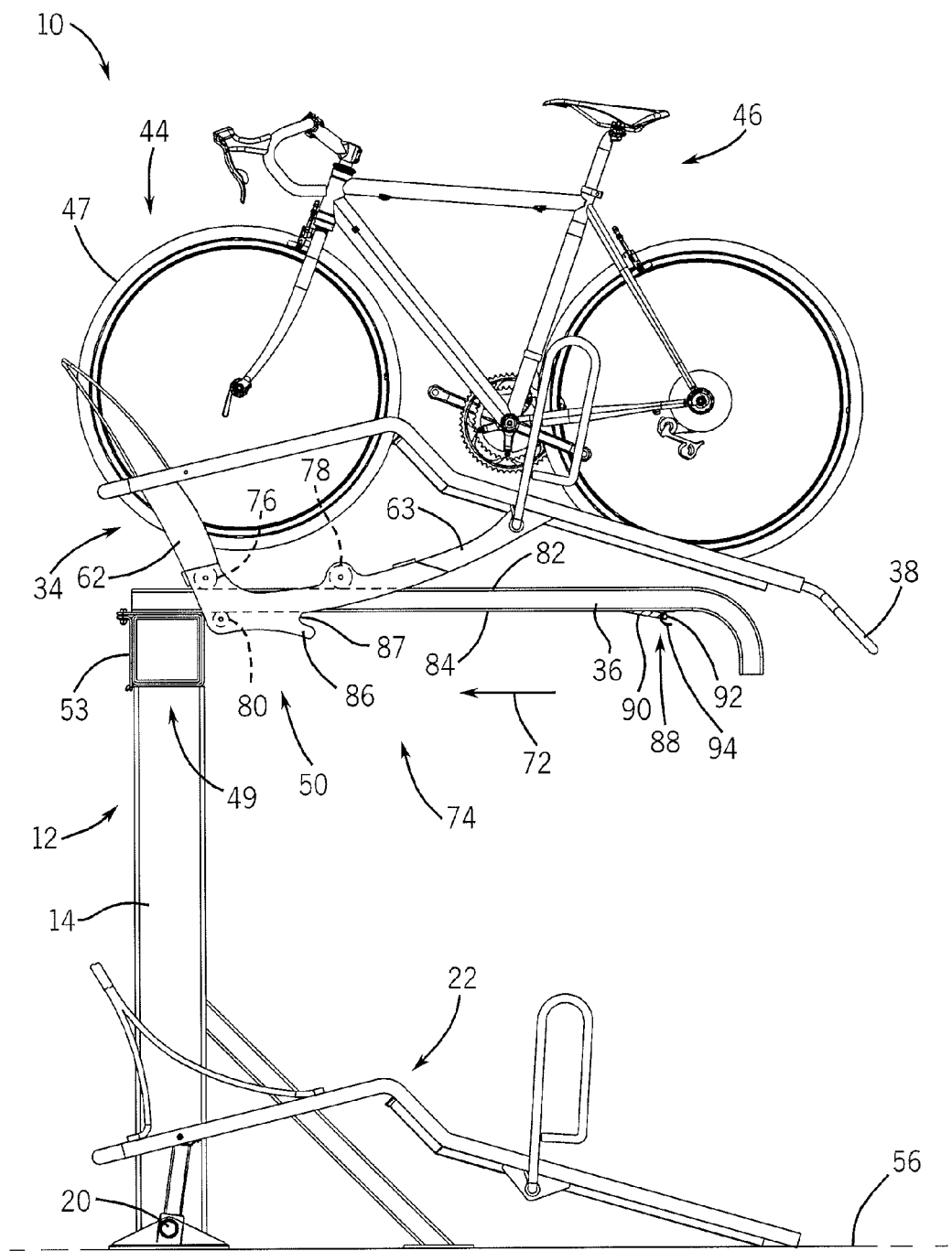
FIG. 6 is end elevational view of the bicycle parking system as in FIG. 5, showing the upper support and the bicycle moved to the retracted, stored position.

As shown in FIGS. 4-6, each upper support 34 is movably engaged with a respective slide bar 36, and is movable between a retracted position for storage (as shown in FIG. 6) and an extended position for loading a bicycle 46 onto, or removing a bicycle 46 from, the upper support 34. Such a construction allows each upper support 34 to be extended or retracted relative to adjacent lower supports 22 independently of other upper supports 34. A user desiring to store a bicycle 46 in an upper support 34 translates the upper support 34, using the grab handle 38, from the retracted position in a direction indicated by arrow 48 toward the extended position.

Each upper support 34 includes an engagement assembly 50 that is movable on the associated slide bar 36 to provide movement of the upper support 34 between the retracted and extended positions. The slide bar 36 is oriented generally horizontally throughout a majority of its length, and includes a downwardly curved rearward end 52. In a manner to be explained, the downwardly curved rearward end 52 of slide bar 36 provides pivoting or rotational movement of upper support 34, indicated by arrow 54, toward lower supports 22 and a ground surface 56 when upper support 34 is in the extended position.

As noted above, each upper support 34 includes a trough-shaped guide 35 that is configured to guide movement of the upper bicycle 46 and to support the upper bicycle 46. Guide 35 is secured to engagement assembly 50 by means of a pair of spaced apart rear arms 63 and a pair of spaced apart front arms 62, which function to offset guide 35 above slide bar 36. Wheel stop 42 extends upwardly from the forward end of guide 35, generally at the location at which the upper ends of front arms 62 are secured to guide 35. The tubular members at the front area of upper guide 35 flank wheel 47 and act in conjunction with wheel stop 42 to maintain an upright orientation of bicycle 46. Furthermore, upper guide 35 and wheel stop 42 engage wheel 47 such that bicycle 46 remains engaged and upright on upper guide 35 when upper support 34 is moved on slide bar 36 between the extended and retracted positions.

Once bicycle 46 is engaged with the front area of upper guide 35 and wheel stop 42, user translation of upper support 34 in direction 64 (FIG. 4) translates the upper support 34 along slide bar 36. During such initial movement of upper support 34, the curved outer end of slide bar 36 functions to pivot or rotate upper guide 35 and bicycle 46 in a counter-clockwise direction (indicated by arrow 70, FIG. 5) as engagement assembly 50 is advanced inwardly along slide bar 36. Continued translation of upper support 34 in direction 72 along slide bar 36 moves upper support 34 inwardly toward the retracted position, as shown at 74 (FIG. 6) in which upper support 34 is located above the vertically aligned lower support 22. Such a configuration provides a compact, simple to access, multileveled bicycle parking system.

Figure 7:
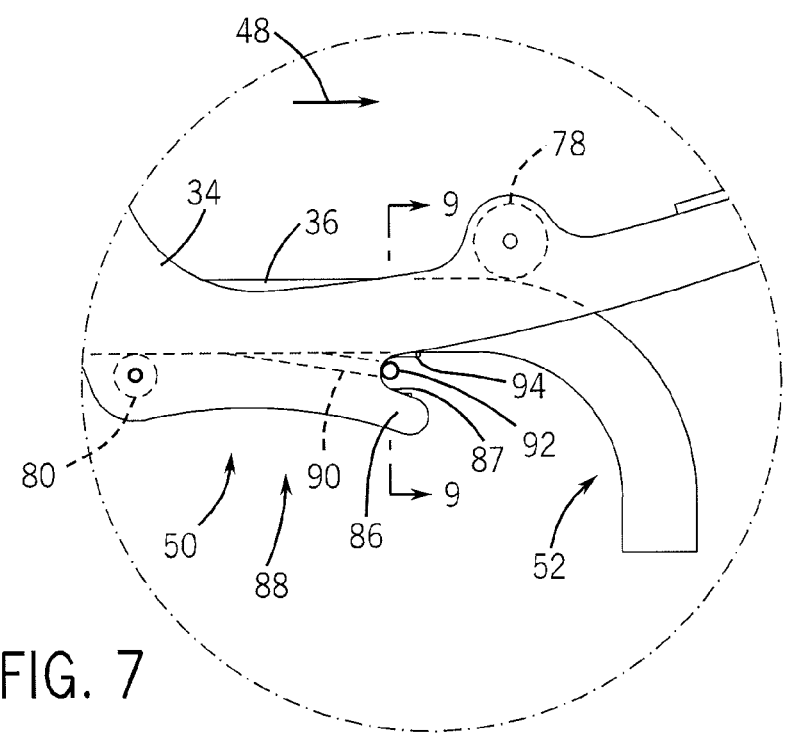
FIG. 7 is an enlarged partial elevation view with reference to line 7-7 of FIG. 5, showing details of an engagement assembly between the upper support and a slide bar of the frame assembly of the bicycle parking system.
Figure 8:
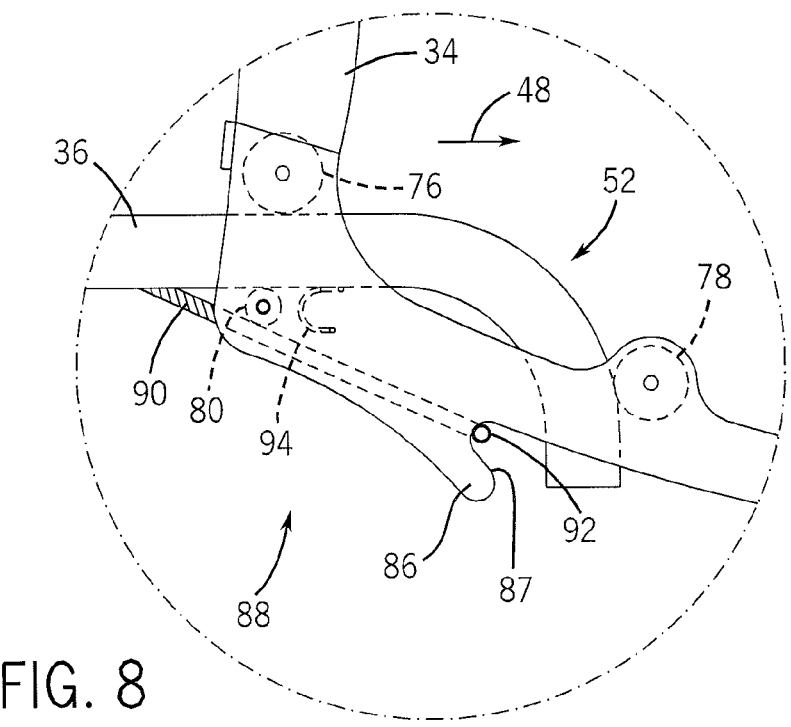
FIG. 8 is an enlarged partial elevation view with reference to line 8-8 of FIG. 4, showing movement of the upper support toward the extended, loading position relative to the slide bar.
Figure 9:
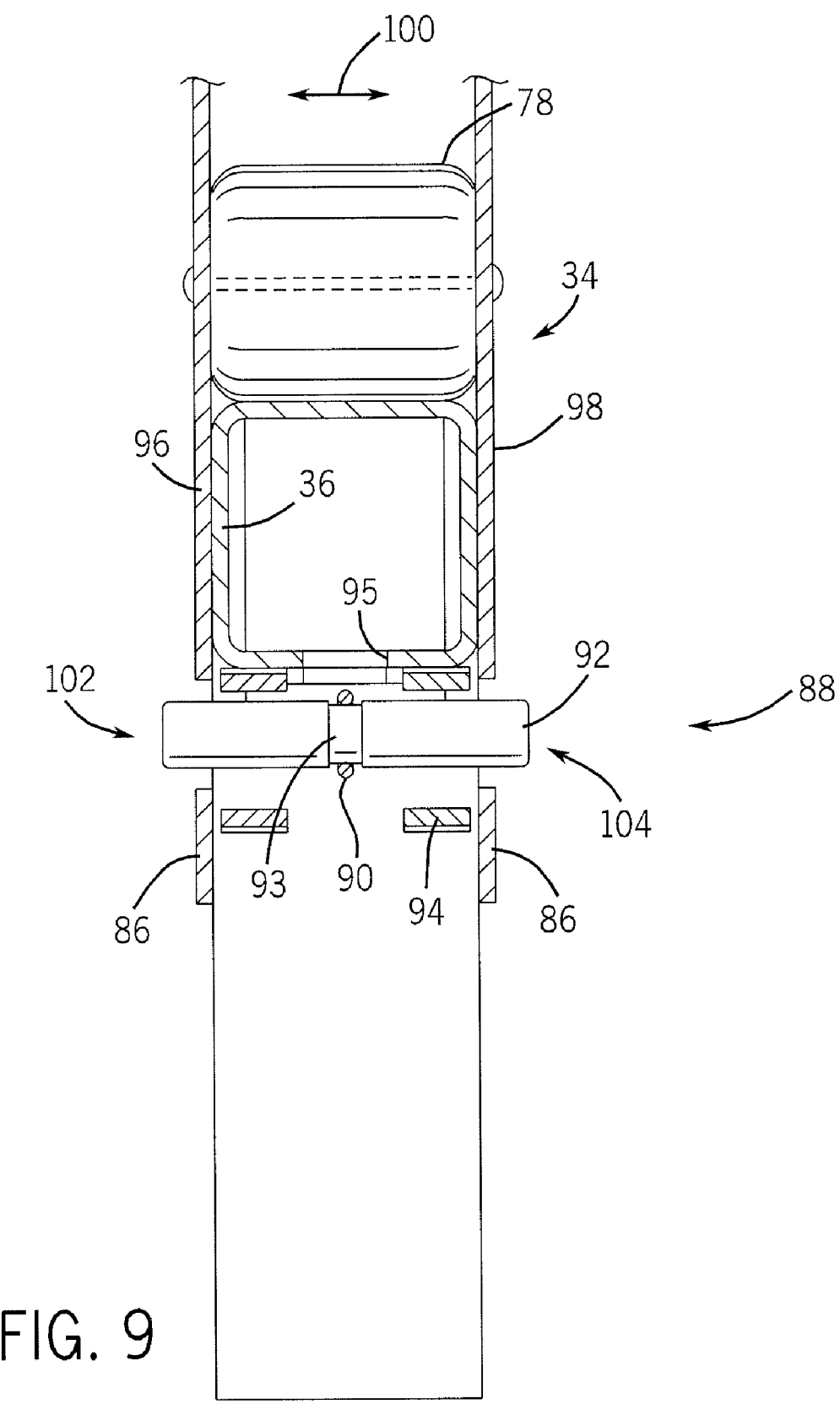
FIG. 9 is a cross-sectional view of the engagement assembly along line 9-9 of FIG. 7.

Referring to FIGS. 6-9, engagement assembly 50 of each upper support 34 includes a series of rotatable rollers 76, 78, 80 that provide movable engagement of upper support 34 with slide bar 36. Upper rollers 76 and 78 engage an upper surface 82 of slide bar 36, and lower roller 80 engages a lower surface 84 of the slide bar 36. Rollers 76, 78, 80 have a length that corresponds to the width of slide bar 36, as shown in FIG. 9, which functions to maintain upper support 34 in an upright position on slide bar 36.

Engagement assembly 50 of upper support 34 includes a pair of rearwardly directed fingers 86, each of which is located adjacent one of the sides of slide bar 36, which function as guides in order to engage the engagement assembly 50 with a spring assembly 88 connected to slide bar 36. Each finger 86 is located adjacent a rearwardly facing recess or notch 87. Spring assembly 88 includes a spring 90, a catch 92 and a retainer 94. Catch 92 extends outwardly from the side surfaces of slide bar 36 and is constructed to operatively engage fingers 86 of upper support 34 when upper support 34 is moved from the retracted position toward the extended position, so as to direct the end areas of the catch 92 into the notches 87 as upper support 34 is moved rearwardly toward the extended position. One end of spring 90 is secured to catch 92, such as by engagement within a groove 93 formed in catch 92, and the other end of spring 90 is secured to slide bar 36. In the illustrated embodiment, slide bar 36 is shown as a rolled member including a downwardly facing slot 95 that extends along its length. Spring 90 extends through slot 95 into the interior of slide bar 36, and is secured to a cross pin or any other satisfactory retaining structure so as to fix the forward end of spring 90 in position.

Retainer 94 is constructed to maintain the position of catch 92 relative to slide bar 36. Retainer 94 is located on slide bar 36 such that spring 90 exerts a forward biasing force on catch 92 when catch 92 is engaged with retainer 94, to maintain a degree of pretension in spring 90 and to maintain catch 92 in engagement with retainer 94.

As shown in FIGS. 7 and 8, translation of upper support 34 in the rearward direction 48 relative to slide bar 36 causes fingers 86 of engagement assembly 50 to operatively engage the ends of catch 92 of spring assembly 88. Continued rearward movement of upper support 34 along curved end 52 of slide bar 36 disengages catch 92 from retainer 94 and positions the ends of catch 92 within notches 87, to draw catch 92 rearwardly along with engagement assembly 50. Such rearward movement of catch 92 stretches spring 90, to apply a forward and upward biasing force on upper support 34 when upper support 34 is moved to the extended position. Accordingly, the engagement of catch 92 and the stretching of spring 90 functions to reduce the user force required to return upper support 34 toward the retracted position from the extended position, shown in FIG. 4. The bias of spring 90 counteracts a portion of the weight of upper support 34 and the loaded bicycle 46, and provides an assist to a user in pivoting or rotating the upper support 34 on the curved end 52 of slide bar 36 until the engagement assembly 50 is moved on the horizontal portion of slide bar 36 past the spring assembly 88. As the engagement assembly 50 is moved forwardly past retainer 94, the ends of catch 92 are engaged by retainer 92 and are moved out of notches 87 and the biasing force applied by spring 90 to engagement assembly 50 is relieved. The user then continues forward movement of upper support 34 by operation of grab handle 38 so as to move upper support 34 to the retracted position for storage of the bicycle 46 supported on upper support 34.

When engagement assembly 50 is moved rearwardly on slide bar 36, the lower roller 80 is advanced toward retainer 94. When the upper support 34 is in the extended position as in FIG. 4, the lower roller 80 contacts retainer 94 to provide a stop against further rearward movement of engagement assembly 50 relative to slide bar 36. Retainer 94 is positioned so as to ensure that the upper roller 78 is maintained in engagement with the upper surface of curved end 52 of slide bar 36, so as to place upper support 34 in the desired angular orientation when in the extended position. In this manner, retainer 94 provides a dual function by both retaining catch 92 and stopping rearward movement of upper support 34.

With this arrangement, the downward pivoting movement of the upper support 34 when in the extended position, in combination with the upward and forward bias on upper support 34 when in the extended position, enables upper support 34 to be accessed, loaded or unloaded even by shorter users or users without a great deal of physical strength.

Referring to FIG. 9, slide bar 36 is generally flanked by opposing sides 96, 98 of upper support 34. The generally planar relationship of sides 96, 98 of upper support 34 and the facing surfaces of slide bar 36 prevents lateral translation of upper support 34 in directions 100, thereby maintaining the generally upright and vertical orientation of a bicycle 46 positioned on the upper supports 34. Spring 90 is selected to counteract a portion of the weight of the upper support 34 when the upper support 34 is in the extended position, such that upper support 34 does not move away from the extended position when it is not loaded. As the upper support 34 is moved from the extended position, in which the upper support 34 is positioned at an angle on curved end 52 of slide bar 36, and toward the retracted position in which the upper support 34 moves on the horizontally oriented portion of slide bar 36, the angle of spring 90 is flattened such that the vertical force component applied by spring 90 is lessened and the horizontal force component applied by spring 90 is increased. This construction provides the greatest degree of vertical force when needed, i.e. when upper support 34 is in the angled orientation in the extended position. As the angle of upper support 34 lessens, the biasing force of spring 90 provides an initial assist in forward movement of upper support 34 on the horizontal portion of slide bar 36 toward the retracted position.

The present invention thus provides a bicycle parking system that includes a frame having a number of upper and lower supports constructed to receive a bicycle. The frame includes a slide bar operatively engaged with each of the upper supports. Each slide bar includes a curved end to allow the attached upper support to rotate relative to the slide bar for loading and unloading of the upper support. A spring assembly constructed to bias each upper support toward a retracted or stored position to assist a user in loading and unloading of the supports.

The invention also provides a bicycle parking system having a frame, a first support, a slide bar and a second support. The first support is attached to the frame for engaging a bicycle. The slide bar has a curved end and is attached to the frame generally above the first support. The second support is for engaging another bicycle and is moveable along the slide bar between a first position and a second position, such that the second support rotates about the curved end of the slide bar for loading and unloading of the second support.

The invention further provides a bicycle rack that includes a frame having a pair of end posts and upper and lower rails that extend between the pair of end posts. At least one lower guide is connected to the lower rail and is constructed to engage a bicycle. At least one upper guide is moveably connected to the upper rail and is constructed to extend from the frame beyond the lower guide and rotate relative to the frame, such that an end of the upper guide rotates toward a ground surface. The bicycle rack includes a wheel stop formed in the upper guide. The wheel stop is constructed to engage a wheel of a bicycle positioned in the upper guide to fix a position of the bicycle across a range of movement of the upper guide.

The invention yet further provides a method of forming a bicycle parking system, including the steps of forming a number of upper and lower bicycle parking assemblies and forming a frame for engaging each of the upper and lower bicycle parking assemblies. The upper and lower bicycle parking assemblies are formed so that each of the upper bicycle parking assemblies extend and rotate relative to a respective lower bicycle parking assembly. The method further includes the step of biasing the upper bicycle parking assembly toward a stored position.

Various alternatives and modifications are contemplated as being within the scope of the following claims, which particularly point out and distinctly claim the subject matter regarded as the invention.

We claim:

1. A bicycle parking system comprising:
   a frame;
   a first, lower support attached to the frame for engaging and supporting a first bicycle;
   a slide member attached to the frame above the first, lower support, wherein the slide member extends along a longitudinal axis outwardly from the frame and defines an inner end secured to the frame and an outer end spaced from the inner end, wherein the slide member has a downward curvature at the outer end such that the outer end of the slide member extends downwardly relative to the inner end; and
   a second, upper support having a bicycle receiving area for receiving and supporting a second bicycle, wherein the second, upper support is engaged with and movable along the slide member between a first position in which the second, upper support is engaged with the slide member toward its inner end and a second position in which the second, upper support is engaged with the outer end of the slide member wherein, when the second, upper support is in the first position the bicycle receiving area faces generally upwardly to support a bicycle in a generally upright position, and wherein, when the second, upper support is in the second position the bicycle receiving area is positioned at an angle relative to the longitudinal axis of the slide member due to the downward curvature at the outer end of the slide member for facilitating loading a bicycle in the bicycle receiving area and unloading a bicycle from the bicycle receiving area.

2. The bicycle parking system of claim 1 wherein the second, upper support further includes a wheel engagement arrangement that maintains the second bicycle on the second, upper support during movement between the first and second positions.

3. The bicycle parking system of claim 2 wherein the wheel engagement arrangement of the second, upper support includes a pair of members constructed to engage a wheel of the second bicycle to retain the second bicycle in a generally vertical orientation on the second, upper support.

4. The bicycle parking system of claim 1 further comprising a roller arrangement carried by the second, upper support and constructed to engage the slide member to provide movement of the second, upper support relative to the slide member.

5. The bicycle parking system of claim 1 further comprising a securing member connected to each of the first, lower support and the second, upper support for use in locking the first and second bicycles to the first, upper support and the second, lower support, respectively.

6. The bicycle parking system of claim 1 including a plurality of said first, lower support and a plurality of said second, upper support, wherein each first, lower support and each second, upper support is vertically offset from adjacent first, lower and second, upper supports, respectively.

7. The bicycle parking system of claim 1 further comprising a biasing member connected between the second, upper support and the slide member and configured to bias the second, upper support toward the first position.

8. A bicycle rack comprising:
a frame having a lower frame member and an upper frame member;
at least one lower bicycle support connected to the lower frame member and constructed to engage and support a first bicycle;
at least one upper bicycle support movably connected to the upper frame member, wherein the upper bicycle support includes a bicycle receiving area for receiving and supporting a second bicycle, wherein the upper bicycle support is movable between a first position in which the upper bicycle support is located above the lower bicycle support and a second position in which the upper bicycle support is located outwardly of the lower bicycle support wherein, when the upper bicycle support is in the first position the bicycle receiving area faces generally upwardly to support a bicycle in a generally upright position, and wherein, when the upper bicycle support is in the second position the bicycle receiving area is positioned at an angle relative to a support surface on which the bicycle rack is positioned for facilitating loading a bicycle in the bicycle receiving area and unloading a bicycle from the bicycle receiving area;
a spring assembly that engages the upper bicycle support as the upper bicycle support is moved from the first position toward the second position and that becomes disengaged from the upper bicycle support as the upper bicycle support is moved from the second position toward the first position, wherein the spring arrangement biases the upper bicycle support toward the first position when the upper bicycle support is in the second position; and
a wheel engagement arrangement associated with the upper bicycle support and configured to engage a wheel of the second bicycle to maintain the second bicycle in engagement with the upper bicycle support throughout movement of the upper bicycle support between the first and second positions.

9. The bicycle rack of claim 8 wherein the upper bicycle support is movably engaged with an upper guide member extending from the upper frame member, the upper guide member having a downwardly curved outer end that engages the upper bicycle support as the upper bicycle support is moved toward the second position to rotate the upper bicycle support relative to the upper guide member.

10. The bicycle rack of claim 9 wherein the upper bicycle support includes a roller arrangement constructed to movably engage the upper guide member for providing movement of the upper bicycle support relative to the upper guide member between the first and second positions.

11. The bicycle rack of claim 9 further comprising a handle associated with the upper bicycle support for facilitating movement of the upper bicycle support relative to the upper frame member between the first and second positions.

12. The bicycle rack of claim 8 wherein the wheel engagement arrangement includes a pair of members constructed to engage opposite sides of the wheel of the bicycle positioned on the upper bicycle support.

13. The bicycle rack of claim 8 including a plurality of said lower bicycle supports and a plurality of said upper bicycle supports, each of the plurality of upper bicycle supports being offset vertically from adjacent upper bicycle supports.

14. The bicycle rack of claim 8 wherein the frame includes a mounting member to which a plurality of said upper supports are secured, wherein the mounting member defines upper and lower surfaces, and wherein the upper bicycle supports are alternately secured adjacent the upper and lower surfaces defined by the mounting member to vertically offset adjacent upper supports from one another.

* * * * *

UNITED STATES PATENT AND TRADEMARK OFFICE
CERTIFICATE OF CORRECTION

| | |
|---|---|
| PATENT NO. | : 7,946,432 B1 |
| APPLICATION NO. | : 11/619940 |
| DATED | : May 24, 2011 |
| INVENTOR(S) | : Neil Swanson et al. |

It is certified that error appears in the above-identified patent and that said Letters Patent is hereby corrected as shown below:

IN THE CLAIMS

CLAIM 8, column 10, line 4, delete "arrangement" and substitute therefore -- assembly --.

Signed and Sealed this
Twelfth Day of July, 2011

David J. Kappos
*Director of the United States Patent and Trademark Office*